2,935,542
PROPYLENE POLYMERS OILS

Leon Sherwood Minckler, Jr., Metuchen, Herbert F. Strohmayer, Roselle, Eugene L. Stogryn, Fords, and Perry A. Argabright, Piscataway, N.J., assignors to Esso Research and Engineering Company, a corporation of Delaware No Drawing. Application September 9, 1958
Serial No. 759,844

4 Claims. (Cl. 260—683.15)

This invention relates to an improved method of preparing low molecular weight oils from propylene. More particularly it relates to a process of this nature for preparing oils of specific characteristics utilizing activated Friedel-Crafts catalysts and the oily products produced thereby.

The low pressure polymerization and copolymerization of alpha olefins and diolefins with catalyst systems made up of a partially reduced, heavy transition metal halide and a reducing metal-containing compound to a high density, often isotactic, high molecular weight, solid, relatively linear products is now well known. These systems employ the reducing compound in excess of equimolar amounts and usually in large excess, e.g. see Ziegler Belgian Patent No. 533.362.

It has now been found that propylene can be polymerized to low molecular weight oils having about one double bond per molecule, that double bond being predominantly in the terminal form, by polymerizing it with a catalyst system consisting of a Friedel-Crafts compound and an aluminum alkyl compound, the molar ratio of Friedel-Crafts compound to aluminum being a minimum of one.

It is surprising that this invention proceeds in the manner listed since the Friedel-Crafts compounds alone or the aluminum alkyl compounds alone are ineffective. The combination of the two is also ineffective for polymerizing ethylene. On the other hand, stannic chloride with zinc diethyl or boron tributyl is ineffective showing the necessity for the aluminum alkyl.

The Friedel-Crafts component of the catalyst system can be any one of these compounds known in the art, e.g. see Schildknecht, "Vinyl and Related Polymers," Wiley (1952), page 541. These materials include $HgCl_2$, $BeCl_2$, $ZnCl_2$, $ZnBr_2$, $CdCl_2$, $CaCl_2$, $BF_3$, $BCl_3$, $BBr_3$, $AlCl_3$, $AlBr_3$, $AlI_3$, $GaCl_3$, $TiCl_4$, $TiBr_4$, $ZrCl_4$, $ZrBr_4$, $SnCl_4$, $SnBr_4$, $SbCl_3$, $SbCl_5$, $MoCl_5$, $BiCl_3$, $FeCl_3$ and $UCl_4$. It should be noted that these materials when employed alone are ineffective, and as stated previously, many of them, such as stannic chloride, are ineffective in Ziegler type catalysts.

The activating material must be an aluminum alkyl compound, which has been found to be absolutely essential in the combination, although ineffective alone. The alkyl component of the alkyl aluminum compound preferably has from one to eight carbon atoms. One or two of the alkyl components can be replaced by halogen atoms so that the formula of the alkyl aluminum compound can be stated as $$RR'AlX$$

Specific examples of preferred alkyl aluminum compounds include $AlEt_3$, aluminum triisobutyl, $AlEt_2Cl$, aluminum sesquichloride, $AlEtCl_2$, $AlEtBr_2$, $AlEt_2Br$, $AlEtI_2$, $AlEt_2I$, $AlMeCl_2$, $AlMe_2Cl$, $AlMeBr_2$, $AlMe_2Br$, $AlMeI_2$, $AlMe_2I$, $AlMe_3$.

A particularly effective catalyst system is made up of stannic chloride and aluminum triethyl.

It is extremely important that the molar ratio of Friedel-Crafts compound to aluminum be a minimum of one. This excess of Friedel-Crafts compounds is required to get the desired polymerization.

The concentration of monomer in the diluent can be in the range of 5–100% preferably 25–75%. The catalyst concentration employed is in the range of 0.1–10 g/100 g. feed preferably 0.3–2g.

The ingredients for the catalyst can be mixed in a variety of ways. These include, e.g.

(1) Addition of olefin to premixed stannic chloride plus aluminum triethyl, (2) Addition of aluminum triethyl to premixed stannic chloride and olefin, (3) Addition of premixed stannic chloride plus aluminum triethyl to olefin feed.

The first method has generally been employed for the higher temperatures of polymerization, whereas the second and third methods are most often used for low temperature polymerizations, although they can be interchanged to the extent that proper control of vigorous reaction can be maintained.

The polymerization is generally carried out in hydrocarbon solvents, preferably aliphatic, e.g. pentane, heptane, cyclohexane, isooctane, etc. at temperatures of about —25° to 100° C., preferably 0° to 50° C. At low temperatures, —150° to —25° C., an alkyl halide solvent is preferable. The molecular weight varies in an inverse manner with temperature. The pressures that can be utilized are in the range of atmospheric to 100 atmospheres. The alkyl halide solvents such as methyl chloride, ethyl chloride, ethylidene difluoride and methylene dichloride can also be used at the higher temperatures.

When the desired degree of polymerization has been reached the mixture is quenched with alcohol, water, acetone, etc. (compounds which destroy the catalyst system); separated by precipitation with non-solvents such as alcohol and acetone and dried by distillation or heating in vacuum. The mixture also can be diluted with a low boiling hydrocarbon and then run through silica or alumina to remove catalyst residues followed by stripping of the low boiling solvent. A water white (colorless) liquid polymer is recovered.

The polymer oils prepared have a molecular weight in the range of 200 to 2000, preferably 300 to 500, the latter containing about 30 carbon atoms. The preferred polymeric oils have an unsaturation of one double bond per molecule which is in the terminal form $$>C=CH_2$$

The preferred oils have bromine numbers of about 32 to 37 indicative of the degree of unsaturation. This particular type of unsaturation adapts the oils for use as intermediates in the synthesis of oil soluble detergents, oil additives, or chemical intermediates. These latter materials may be made by various methods which include sulfonation or sulfation of the propylene polymer or preferably alkylation of an aromatic with the olefin polymer (polypropylene polymer) followed by sulfonation, etc. These materials (sulfonated, etc.) are then used as they are or in the form of suitable salts for specific applications as detergents, oil additives, etc.

Water soluble detergents can be prepared through the use of low molecular weight polypropylene, and synthetic lubes of good quality are obtained by proper selection of reaction conditions, and suitable post modifications where desired. Furthermore, since alkylation occurs if aromatics are present, when propylene is polymerized with these catalyst systems one can obtain alkyl benzenes or alkyl aromatics, the chain lengths being determined by reaction conditions and the aromatic to propylene ratio.

This invention and its advantages will be better understood by reference to the following examples.

EXAMPLE 1

Propylene was polymerized with various materials to demonstate their catalyst activity. The results are presented in Table I below.

*Table I*

| Example | I | II | III | IV | V | VI |
|---|---|---|---|---|---|---|
| Catalyst | $SnCl_4$ | $AlEt_3$ | ½ $AlEt_3/SnCl_4$ | 2 $AlEt_3/SnCl_4$ | ½ $AlEt_3/SnCl_4$ | ½ $AlEt_3/HgCl_2$. |
| Solvent | Heptane (200 g.) | Heptane (200 g.) | Heptane (200 g.) | Heptane (200 g.) | Isooctane (100 g.) | Heptane (200 g.). |
| Temperature, °C | 80 | 80 | 80–90 | 80 | 35–85 | 80–84. |
| $N_2$ Pressure (atm.) | 1 and 28 | 1 | 28 | 28 | 1 | 28. |
| Time (Hours) | 2 | 2 | 2¼ | 2 | 2 | 2. |
| Yield of Polymer, Percent | 0 | 0 | 100 | 0 | 20 | 40. |
| Molecular Weight | | | 408 | | 441 | 422. |
| Bromine No | | | 32.4 | | | 36.8. |

These results show that aluminum triethyl and stannic chloride alone were not possessed of catalytic activity. In each case the ratio of Friedel-Crafts component to aluminum triethyl, where the two components were utilized, was 2 except in colum IV. The latter shows that where the molar ratio of Friedel-Crafts component to aluminum alkyl was less than 1, no polymerization took place.

The advantages of this invention will be apparent to the skilled in the art. Polymeric oils of a nature suitable for use as intermediates for detergents and lubricating oils are made available. The products have a much narrower M.W. spread than those prepared with other catalysts, e.g. $BF_3/HF$.

It is to be understood that this invention is not limited to the specific examples which have been offered merely as illustrations and that modifications may be made without departing from the spirit of the invention.

What is claimed is:

1. A process for preparing low molecular weight oils having about one double bond per molecule, said double bond being predominantly in the terminal form which comprises polymerizing propylene with a catalyst system consisting of a Friedel-Crafts compound, selected from the group consisting of stannic chloride and mercuric chloride, and an aluminum alkyl compound, the molar ratio of Friedel-Crafts compound to aluminum alkyl being a minimum of one.

2. The process of claim 1 in which the aluminum alkyl compound is aluminum triethyl.

3. The process of claim 2 in which the Friedel-Crafts compound is stannic chloride.

4. The process of claim 2 in which the Friedel-Crafts compound is mercuric chloride.

References Cited in the file of this patent

FOREIGN PATENTS

| 562,101 | Italy | May 14, 1955 |
| 538,782 | Belgium | Dec. 6, 1955 |
| 543,941 | Belgium | Mar. 24, 1956 |
| 785,314 | Great Britain | Oct. 23, 1957 |